US010823575B2

(12) United States Patent
Zhang

(10) Patent No.: US 10,823,575 B2
(45) Date of Patent: Nov. 3, 2020

(54) REFERENCE LINE SMOOTHING METHOD USING PIECEWISE SPIRAL CURVES WITH WEIGHTED GEOMETRY COSTS

(71) Applicant: Baidu USA LLC, Sunnyvale, CA (US)

(72) Inventor: Yajia Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 58 days.

(21) Appl. No.: 16/020,828

(22) Filed: Jun. 27, 2018

(65) Prior Publication Data

US 2020/0003564 A1    Jan. 2, 2020

(51) Int. Cl.
| | |
|---|---|
| *G01C 21/32* | (2006.01) |
| *G05D 1/02* | (2020.01) |
| *G06T 11/20* | (2006.01) |
| *G06F 17/10* | (2006.01) |
| *G05D 1/00* | (2006.01) |

(52) U.S. Cl.
CPC ......... *G01C 21/32* (2013.01); *G05D 1/0088* (2013.01); *G05D 1/0212* (2013.01); *G06F 17/10* (2013.01); *G06T 11/203* (2013.01); *G05D 2201/0213* (2013.01)

(58) Field of Classification Search
CPC ...... G05D 1/0212; G01C 21/32; G06T 11/203
See application file for complete search history.

(56) References Cited

U.S. PATENT DOCUMENTS 9,120,485 B1 * 9/2015 Dolgov ............... B60W 30/10
10,429,849 B2 * 10/2019 Zhang ................. G05D 1/0268
2008/0275602 A1 * 11/2008 Peake .................. G05D 1/0212
                                                                    701/25
2010/0076640 A1 * 3/2010 Maekawa ............ G05D 1/0217
                                                                    701/26
2016/0313133 A1 * 10/2016 Zeng ............... B60W 30/18163
(Continued)

OTHER PUBLICATIONS

Artunedo et. al., "Smooth path planning for urban autonomous driving using OpenStreetMaps", 2017, IEEE Intelligent Vehicles Symposium (Year: 2017).*

(Continued)

*Primary Examiner* — Anshul Sood
*Assistant Examiner* — Emily J Senn
(74) *Attorney, Agent, or Firm* — Womble Bond Dickinson (US) LLP

(57) ABSTRACT

A first reference line representing a routing line from a first location to a second location associated with an autonomous driving vehicle (ADV) is received. The first reference line is segmented into a number of reference line segments. For each of the reference line segments, a quintic polynomial function is defined to represent the reference line segment. An objective function is determined based on the quintic polynomial functions of the reference line segments. An optimization is performed on coefficients of the quintic polynomial functions in view of a set of constraints associated with the reference line segments, such that an output of the objective function reaches minimum while the constraints are satisfied. A second reference line is then generated based on the optimized parameters or coefficients of the quintic polynomial functions of the objective function. The second reference line is then utilized to plan and control the ADV.

16 Claims, 12 Drawing Sheets

(56) References Cited

U.S. PATENT DOCUMENTS

| | | | |
|---|---|---|---|
| 2018/0099667 A1* | 4/2018 | Abe | B60W 10/20 |
| 2019/0079523 A1* | 3/2019 | Zhu | G08G 1/16 |
| 2019/0079528 A1* | 3/2019 | Zhu | B60W 30/143 |
| 2019/0080266 A1* | 3/2019 | Zhu | G01C 21/3453 |
| 2019/0086930 A1* | 3/2019 | Fan | G05D 1/0223 |
| 2019/0086932 A1* | 3/2019 | Fan | G08G 1/16 |
| 2019/0250000 A1* | 8/2019 | Zhang | G01C 21/3407 |
| 2019/0257664 A1* | 8/2019 | Matsuda | G01C 21/3453 |
| 2019/0262993 A1* | 8/2019 | Cole | B25J 9/1674 |
| 2019/0310644 A1* | 10/2019 | Zhang | G05D 1/0088 |

OTHER PUBLICATIONS

Nelson, "Continuous-Curvature Paths for Autonnnous Vehicles", 1989, IEEE, 1989 International Conference on Robotics and Automation (Year: 1989).*

Alonzo Kelly et. al., "Reactive Nonholonomic Trajectory Generation via Parametric Optimal Control", Jul. 2003, The International Journal of Robotics Research, vol. 22, No. 8, pp. 583-601 (Year: 2003).*

* cited by examiner

900

```
┌─────────────────────────────────────────────┐
│ Process map data, to generate points that   │
│ define a reference line along an ADV route  │
│ from a first location to a second location, │
│ wherein each point has a two dimensional    │
│ coordinate and each consecutive pair of     │
│ points form a reference line segment along  │
│ the reference line.                         │
│                    910                      │
└─────────────────────────────────────────────┘
                     │
                     ▼
┌─────────────────────────────────────────────┐
│ Initialize optimization parameters: the     │
│ length of each reference line segment, the  │
│ two-dimensional coordinate of each point, a │
│ direction of each reference line segment, a │
│ curvature of each reference line segment,   │
│ and a curvature change rate of each         │
│ reference line segment.                     │
│                    920                      │
└─────────────────────────────────────────────┘
                     │
                     ▼
┌─────────────────────────────────────────────┐
│ Optimize the optimization parameters of the │
│ route such that an output of an objective   │
│ function is minimized, and a set of         │
│ constraints associated with the reference   │
│ line segments are satisfied.                │
│                    930                      │
└─────────────────────────────────────────────┘
                     │
                     ▼
┌─────────────────────────────────────────────┐
│ Generate a smooth reference line based on   │
│ the optimized parameters, wherein the       │
│ smooth reference line is utilized as a      │
│ reference to direct the ADV from the first  │
│ location to the second location.            │
│                    940                      │
└─────────────────────────────────────────────┘
```

FIG. 9

REFERENCE LINE SMOOTHING METHOD USING PIECEWISE SPIRAL CURVES WITH WEIGHTED GEOMETRY COSTS

TECHNICAL FIELD

Embodiments of the present disclosure relate generally to operating autonomous driving vehicles. More particularly, embodiments of the disclosure relate to generating reference lines of trajectories for operating autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Particularly, trajectory planning or route planning is a critical component in an autonomous driving system. Conventional planning techniques rely heavily on high-quality reference lines, which are guidance paths, e.g., a center line of a road, for autonomous driving vehicles, to generate stable trajectories. Usually, the map data (typically a sequence of two-dimensional (2D) points in the world frame) directly from sensors cannot provide the required smoothness, and therefore directly using the map data may cause the planners generating unstable and oscillating trajectories between planning cycles.

BRIEF DESCRIPTION OF THE DRAWINGS

Embodiments of the disclosure are illustrated by way of example and not limitation in the figures of the accompanying drawings in which like references indicate similar elements.

FIG. 9 is a flow diagram illustrating another example of process for optimizing a reference line according to one embodiment.

DETAILED DESCRIPTION

Figure 1:
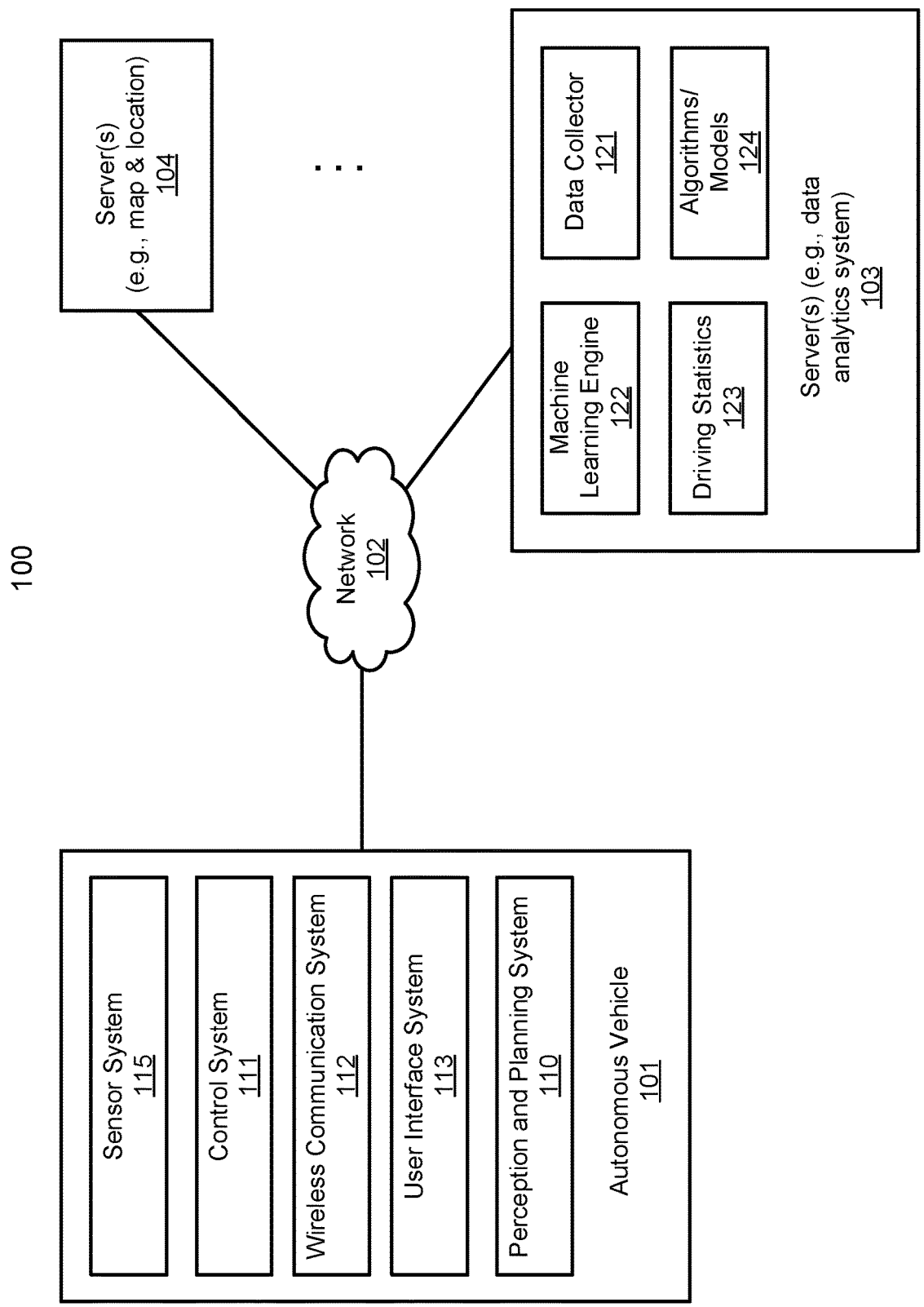
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a new constrained numerical optimization method is utilized that takes the map data in a format of a sequence of 2D points and generates a smooth and piecewise concatenated reference line with minimal curvature changes. Given a sequence of 2D points, the system first connects consecutive points using arbitrary quintic polynomial spiral paths. By perturbing these piecewise paths, the optimization system finds a best set of these paths that have the overall minimal curvature changes, and are smoothly connected at the joint points up to the third derivative, in an iterative fashion.

The quintic polynomial spiral paths are utilized as piecewise paths to simplify the objective formulation. The objective of the optimization is to minimize the overall curvature changes along the reference line. However, it is extremely complex to formulate the objective if the piecewise paths are defined in world frames (e.g., in Cartesian space). To solve the problem, spiral paths, i.e., the curve direction is function of curve length, are utilized as piecewise paths, and therefore the objective can be easily formulated. The coordinates of the points in the spiral path can be computed using numerical integration. In addition, users can define their "trust" on the map data according to their confidence level. The "trust" can be modeled using the maximal deviation of one input point in the final output and can be considered directly in the method.

According to one embodiment, a first reference line representing a trajectory or routing line from a first location to a second location associated with an autonomous driving vehicle (ADV) is received. The first reference line was generated from map data associated with the route from the first location to the second location. The first reference line is segmented into a number of reference line segments. For each of the reference line segments, a quintic polynomial function (also simply referred to as a quintic function) is defined to represent the corresponding reference line segment. An objective function is determined based on the quintic polynomial functions of the reference line segments. An optimization is then performed on parameters or coefficients of the quintic polynomial functions in view of a set of constraints associated with the reference line segments, such that an output of the objective function reaches minimum while the set of constraints are satisfied. A second reference line is then generated based on the optimized parameters or coefficients of the quintic polynomial functions of the objective function. The second reference line is then utilized to plan the trajectory or routing line for the ADV.

In one embodiment, the objective function represents a sum of all outputs of the quintic polynomial functions of all reference line segments. In a particular embodiment, the objective function is configured based on a sum of second order derivatives of the quintic polynomial functions of the reference line segments. The coefficients of a quintic polynomial function of each reference line segment are determined based on the reference line direction, curvature and curvature change rate at the reference line's two terminals, and a length of the reference line segment, in view of the set of constraints. In one embodiment, the optimization on the parameters of the quintic polynomial functions includes optimizing the coefficients of each quintic polynomial function, such that the output of the quintic polynomial functions have minimal curvature changes.

In one embodiment, the set of constraints further includes a condition in which a first order derivative of a quintic polynomial function at a starting point of a reference line segment is similar to a curvature at the starting point of the reference line segment. A first order derivative of the quintic polynomial function at an ending point of the reference line segment is the same or similar to a curvature at a starting point of a next reference line segment. In another embodiment, the set of constraints further includes a condition in which a second order derivative of the quintic polynomial function at the starting point of the reference line segment is similar to a curvature change rate at the starting point of the reference line segment. A second order derivative of the quintic polynomial function at the ending point of the reference line segment is the same or similar to a curvature change rate at the starting point of the next reference line segment. The set of constraints further includes a condition in which a difference between a terminal point on the first reference line and a corresponding terminal point derived from the quintic polynomial function is below a predetermined threshold, where the threshold may be user configurable, e.g., dependent upon the confidence or trust level associated with the sensors of the ADV.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
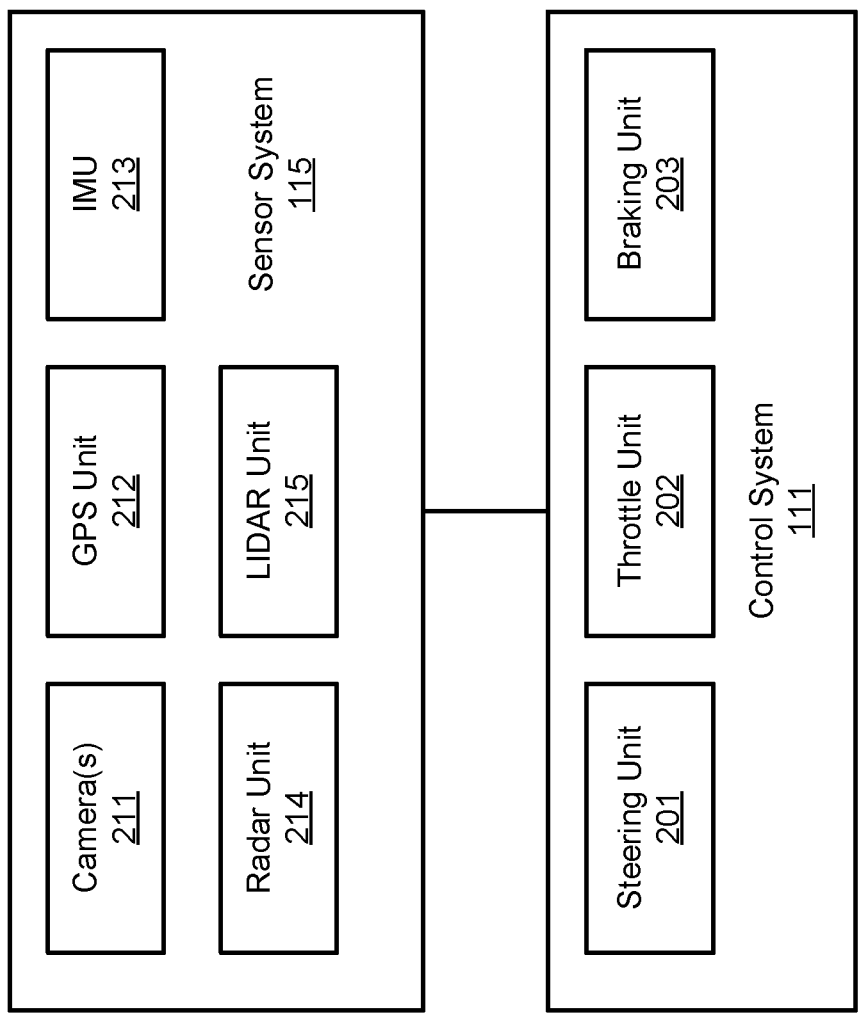
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of quintic polynomial functions may be selected and defined with initial coefficients or parameters. Furthermore, a set of constraints may also be defined based on the hardware characteristics such as sensors specification and specific vehicle designs, which may obtained from the driving statistics 123.

Figure 3A:
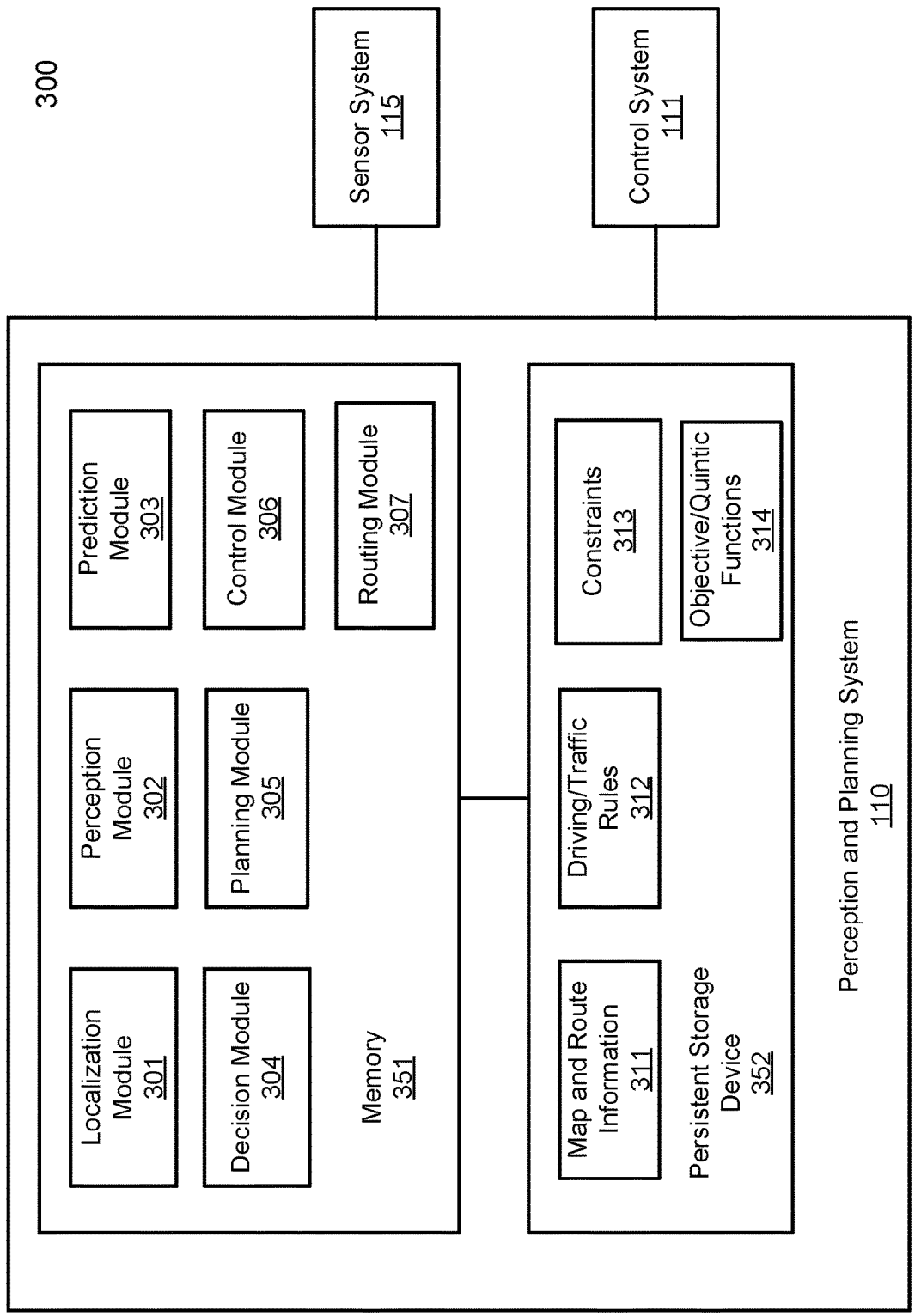
FIGS. 3A-3B are block diagrams illustrating an example of a perception and planning system used with an autonomous vehicle according to one embodiment.
Figure 3B:
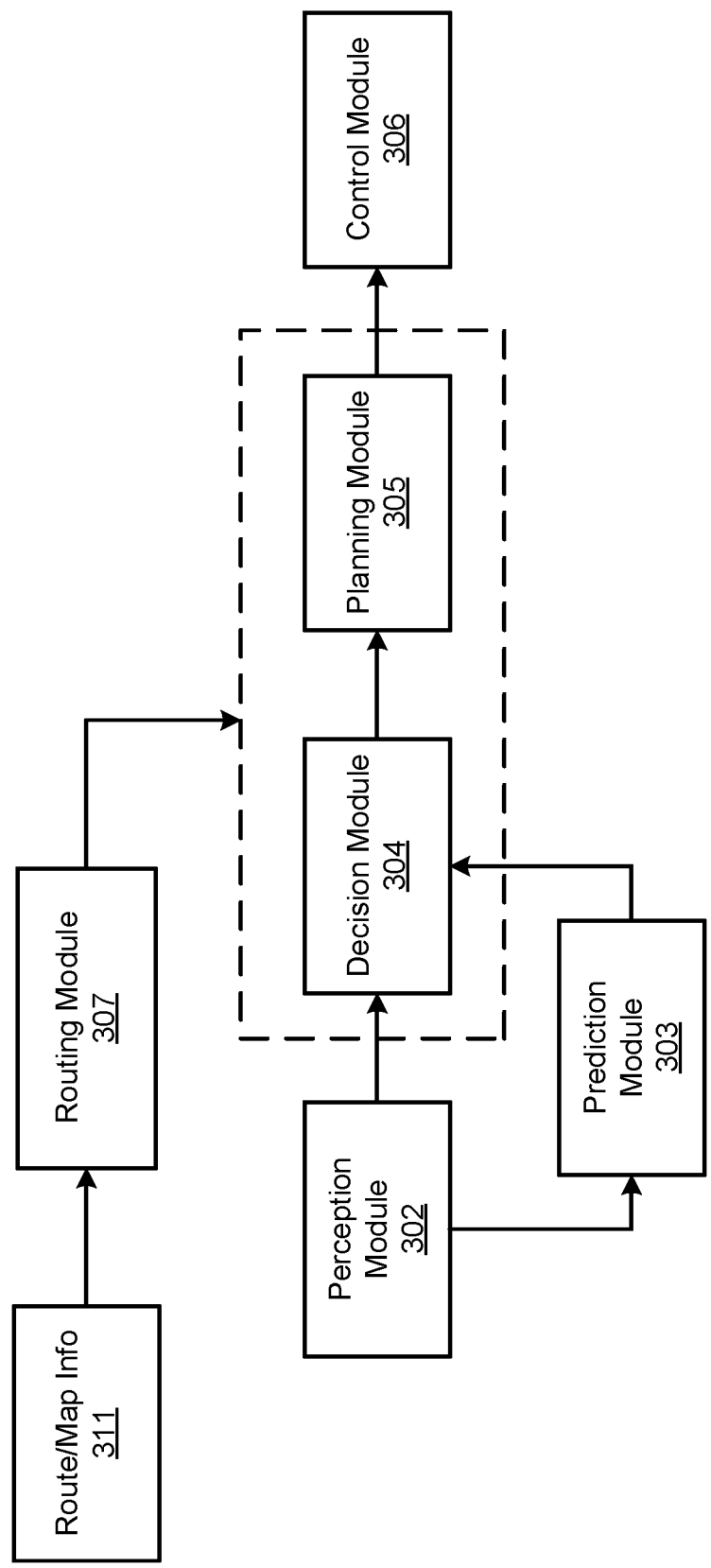

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle. Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference route is generated by generating reference points along the reference route. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

However, in some situations, the reference line generated from the map data is not smooth enough that may cause discomfort to the riders or control errors of the vehicle. Sometimes the reference line going through a reference point is not smooth enough. In order to have a smooth enough reference line, the curvature before and after each reference point should be close to each other. In addition, the curvature change rate should be reduced.

According to one embodiment, a new constrained numerical optimization method is utilized, for example, by planning module 305, which takes the map data in a format of a sequence of 2D points and generates a smooth and piecewise concatenated reference line with minimal curvature changes. Given a sequence of 2D points, the system first connects consecutive points using arbitrary quintic polynomial spiral paths. By perturbing these piecewise paths, the optimization system finds a best set of these paths that have the overall minimal curvature changes, and are smoothly connected at the joint points up to the third derivative, in an iterative fashion.

The quintic polynomial spiral paths are utilized as piecewise paths to simplify the objective formulation. The objective of the optimization is to minimize the overall curvature changes along the reference line. However, it is extremely complex to formulate the objective if the piecewise paths are defined in world frames (e.g., in Cartesian space). To solve the problem, spiral paths, i.e., the curve direction is function of curve length, are utilized as piecewise paths, and therefore the objective can be easily formulated. The coordinates of the points in the spiral path can be computed using numerical integration. In addition, users can define their "trust" on the map data according to their confidence level. The "trust" can be modeled using the maximal deviation of one input point in the final output and can be considered directly in the method.

Figure 4:
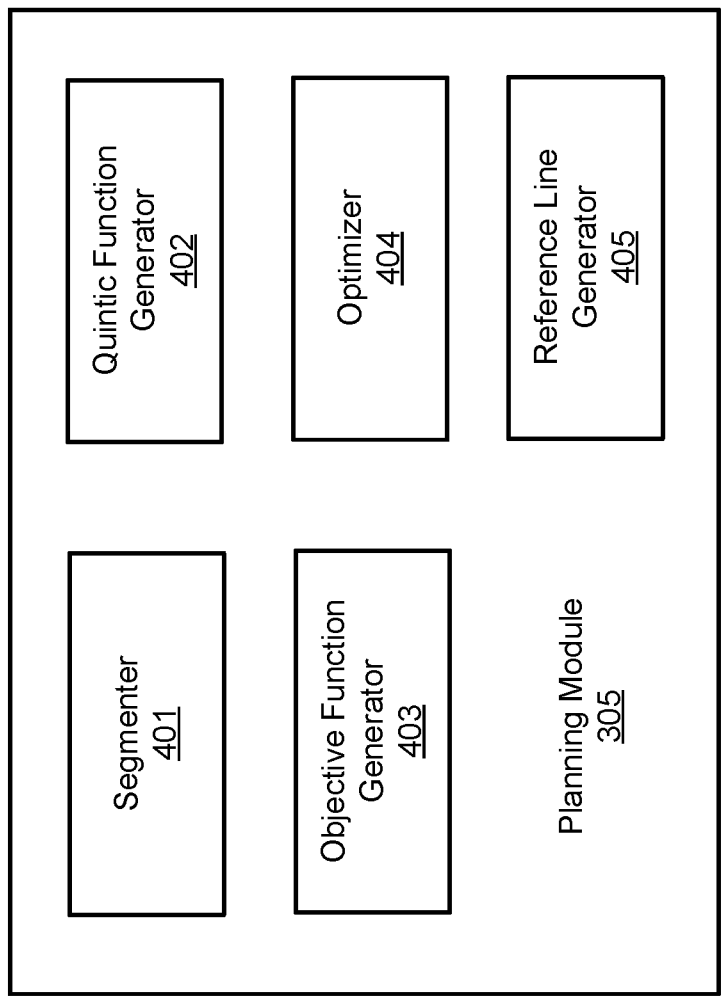
FIG. 4 is a block diagram illustrating an example of a planning module according to one embodiment.

FIG. 4 is a block diagram illustrating an example of a planning module according to one embodiment. Referring to FIG. 4, planning module 305 includes, but is not limited to, a segmenter 401, a quintic function generator 402, an object function generator 403, an optimizer 404, and a reference line generator 405. These modules 401-405 may be implemented in software, hardware, or a combination thereof. Segmenter 401 is configure to segment a first reference line into a number of reference line segments. For each of the reference line segments, quintic function generator 402 is configured to define and generate a quintic polynomial function to represent the corresponding reference line segment. Objective function generator 403 is configured to generate an objective function based of the quintic polynomial functions of the reference line segments. The quintic polynomial functions and/or the objective functions may be preconfigured and stored as a part of functions 314. Optimizer 404 is configured to perform an optimization on the objective function, such that the objective function reaches minimum in view of a set of constraints, which are configured by a constraint generator of planning module 305 (not shown) as a part of constraints 313. Reference line generator 405 is configured to generate a second reference line based on the optimization, i.e., using the parameters or coefficients of the optimized objective function. One of the goals of the optimization is to determine a new set of reference points representing the second reference line that are close to the corresponding original reference points of the first reference line, while the curvature changes or changing rates between the reference line segments are maintained minimum. Less curvature change leads to a smoother reference line.

Figure 5:
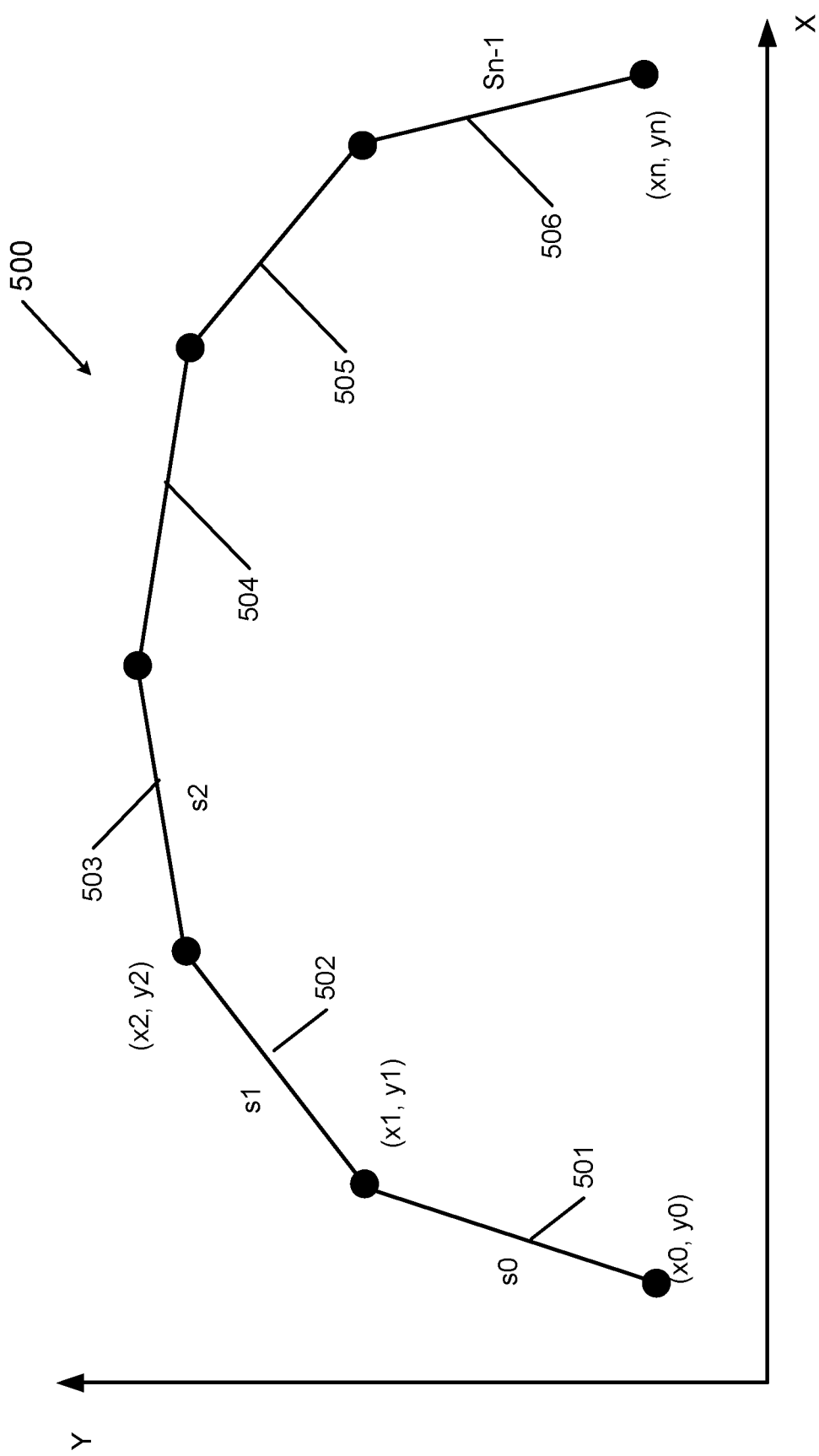
FIG. 5 shows a reference line segmented into a number of reference line segments according to one embodiment.

FIG. 5 is a diagram illustrating an example of a reference line generated based on map data. Referring to FIG. 5, according to one embodiment, segmenter 401 segments the reference line 500 into a number of reference line segments. Each reference line segment is terminated by two reference points. In this example, there are n reference points (x0, y0), (x1, y1), . . . , (xn, yn), referred to herein as reference line segments 501-506. Each reference line segment is associated with a segment length s. For example, reference line segment between reference points (x0, y0) and (x1, y1) is associated with segment length s0. Thus, for n reference points, there are (n−1) reference line segments. Each reference line segment is modeled using a separate quintic polynomial function.

For each of the reference line segments, quintic function generator 402 generates a quintic polynomial function θ(s). Thus, there are at least (n−1) quintic polynomial functions θ0(s) to θn−1(s). In one embodiment, each quintic polynomial function represents a direction of a starting reference point of the corresponding reference line segment. A derivative (e.g., the first order derivative) of the quintic polynomial function represents a curvature of the starting reference point of the reference line segment, K=dθ/ds. A second order derivative of the quintic polynomial function represents a curvature change or curvature change rate, dK/ds.

For the purpose of illustration, following terms are defined:

$\theta_0$: starting direction
$\dot{\theta}_0$: starting curvature, κ, direction derivative w.r.t. curve length, i.e., $$\frac{d\theta}{ds}$$

$\ddot{\theta}_0$: starting curvature derivative, i.e., $$\frac{d\kappa}{ds}$$

$\theta_1$: ending direction
$\dot{\theta}_1$: ending curvature
$\ddot{\theta}_1$: ending curvature derivative
Δs: the curve length between the two ends Each piecewise spiral path is decided by seven parameters: starting direction (θ0), starting curvature (dθ0), starting curvature derivative (d2θ0), ending direction (θ1), ending curvature (dθ1), ending curvature derivative (d2θ1) and the curve length between the starting and ending points (Δs). In one embodiment, a quintic polynomial function can be defined as follows:

$$\theta_i(s) = a*s^5 + b*s^4 + c*s^3 + d*s^2 + e*s + f$$

and it satisfies $$\theta_i(0) = \theta_i$$
$$\dot{\theta}_i(0) = \dot{\theta}_i$$
$$\ddot{\theta}_i(0) = \ddot{\theta}_i$$
$$\theta_i(\Delta s) = \theta_{i+1}$$
$$\dot{\theta}_i(\Delta s) = \dot{\theta}_{i+1}$$
$$\ddot{\theta}_i(\Delta s) = \ddot{\theta}_{i+1}$$

Based on the above constraints, the optimization is performed on all quintic polynomial functions of all reference line segments, such that the output of a quintic polynomial function representing reference line segment (i) at zero segment length should be the same as or similar to a direction at the starting reference point of the corresponding reference line segment (i). A first order derivative of the quintic polynomial function should be the same as or similar to a curvature at the starting reference point of the reference line segment (i). A second order derivative of the quintic polynomial function should be the same as or similar to a curvature change rate at the starting reference point of the reference line segment (i).

Similarly, the output of a quintic polynomial function representing reference line segment (i) at the full segment length (s) should be the same as or similar to a direction at the starting reference point of the next reference line segment (i+1), which is the ending reference point of the current reference line segment (i). A first order derivative of the quintic polynomial function should be the same as or similar to a curvature at the starting reference point of the next reference line segment (i+1). A second order derivative of the quintic polynomial function should be the same as or similar to a curvature change rate at the starting reference point of the next reference line segment (i+1).

For example, for reference line segment 501 as shown in FIG. 5, an output of the corresponding quintic polynomial function θ(0) represents a direction or angle of starting point (x0, y0). θ(Δs0) represents a direction of ending point (x1, y1), where point (x1, y1) is also the starting point of the next reference line segment 502. A first order derivative of θ(0) represents a curvature at starting point (x0, y0) and a second order derivative of θ(0) represents a curvature change rate at starting point (x0, y0). A first order derivative of θ(s0) represents a curvature of ending point (x1, y1) and a second order derivative of θ(s0) represents a curvature change rate of ending point (x1, y1).

By substituting the above variables $\theta_i$, $\dot{\theta}_i$, $\ddot{\theta}_i$, $\theta_{i+1}$, $\dot{\theta}_{i+1}$, $\ddot{\theta}_{i+1}$, Δs in, there will be six equations that can be utilized to solve the coefficients of the quintic polynomial function a, b, c, d, e, and f. For example, as stated above, the direction at a given point can be defined using the above quintic polynomial function:

$$\theta(s) = as^5 + bs^4 + cs^3 + ds^2 + es + f$$

The first order derivative of the quintic function represents a curvature at the point of the path:

$$d\theta = 5as^4 + 4bs^3 + 3cs^2 + 2ds + e$$

The second order derivative of the quintic function represents a curvature change rate at the point of the path:

$$d^2\theta = 20as^3 + 12bs^2 + 6cs + 2d$$

For a given spiral path or reference line segment, there are two points involved: a starting point and an ending point, where the direction, curvature, and curvature change rate of each point can be represented by the above three equations respectively. Thus, there are a total of six equations for each spiral path or reference line segment. These six equations can be utilized to determine the coefficients a, b, c, d, e, and f of the corresponding quintic function.

When a spiral path is utilized to represent a curve between consecutive reference points in the Cartesian space, there is a need to build a connection or bridge between the spiral path curve length and a position in the Cartesian space. Given a spiral path $\theta_i(s)$ defined by $\{\theta_i, d\theta_i, d^2\theta_i, \theta_{i+1}, d\theta_{i+1}, d^2\theta_{i+1}, \Delta s\}$, and path starting point $p_i = (x_i, y_i)$, we need to determine the coordinate of point p=(x, y) given any s=[0, Δs]. In one embodiment, the coordinates of a given point can be obtained based on the following formula:

$$x = x_i + \int_0^s \cos(\theta_i(s))ds$$

$$y = y_i + \int_0^s \sin(\theta_i(s))ds$$

When s=Δs, the ending coordinates pi+1 are obtained given curve θi and starting coordinates pi=(xi, yi). The optimization of the quintic functions are performed such that the overall output of the quintic functions of the spiral paths reach minimum, while the above set of constraints are satisfied. In addition, the coordinates of the terminal point derived from the optimization is required to be within a predetermined range (e.g., tolerance, error margins) with respect to the corresponding coordinates of the initial reference line. That is, the difference between each optimized point and the corresponding point of the initial reference line should be within a predetermined threshold.

According to one embodiment, an objective function is defined based on the quintic functions of all spiral paths. An optimization is performed on the input parameters of the quintic functions (e.g., $\theta_i$, $\dot{\theta}_i$, $\ddot{\theta}_i$, $\theta_{i+1}$, $\dot{\theta}_{i+1}$, $\ddot{\theta}_{i+1}$, $\Delta s$) of the objective function, while the constraints described above are satisfied. In one embodiment, the objective function represents a sum of all quintic functions associated with all reference line segments, and the optimization is performed, such that the output of the objective function reaches minimum while the above set of constraints are satisfied. The optimization is iteratively performed, the variables are modified, and the set of constraints are evaluated, until the output of the objective function in a current iteration is similar to the output of the objective function in a previous iteration. The term of "similar" herein refers to the difference between the outputs of two consecutive iterations is below a predetermined threshold.

In this approach, a reference line is modeled as a sequence of piecewise quintic spiral paths with two consecutive reference points connected with one spiral path, as shown in FIG. 5. The input points are allowed to slightly deviate from their original positions within a predetermined boundary or boundaries, which may be defined or configured by a user. The boundaries model the confidence level of the sensor accuracy, handling labeling errors, etc., when generating the map data. In one embodiment, the variables in the optimization are selected as follows, given n points $p_0=(\bar{x}_0, \bar{y}_0), \ldots, p_{n-1}=(\bar{x}_{n-1}, \bar{y}_{n-1})$.

$$\begin{array}{ccccc} \theta_0 & \theta_1 & \theta_2 & \ldots & \theta_{n-2} & \theta_{n-1} \\ \dot{\theta}_0 & \dot{\theta}_1 & \dot{\theta}_2 & \ldots & \dot{\theta}_{n-2} & \dot{\theta}_{n-1} \\ \ddot{\theta}_0 & \ddot{\theta}_1 & \ddot{\theta}_2 & \ldots & \ddot{\theta}_{n-2} & \ddot{\theta}_{n-1} \\ \Delta s_0 & \Delta s_1 & & \ldots & \Delta s_{n-2} & \end{array}$$

The smoothness of the reference line is modeled as the absolute value of the curvature change rate, i.e., a second order derivative of quintic function $\theta(s)$.

Figure 6:
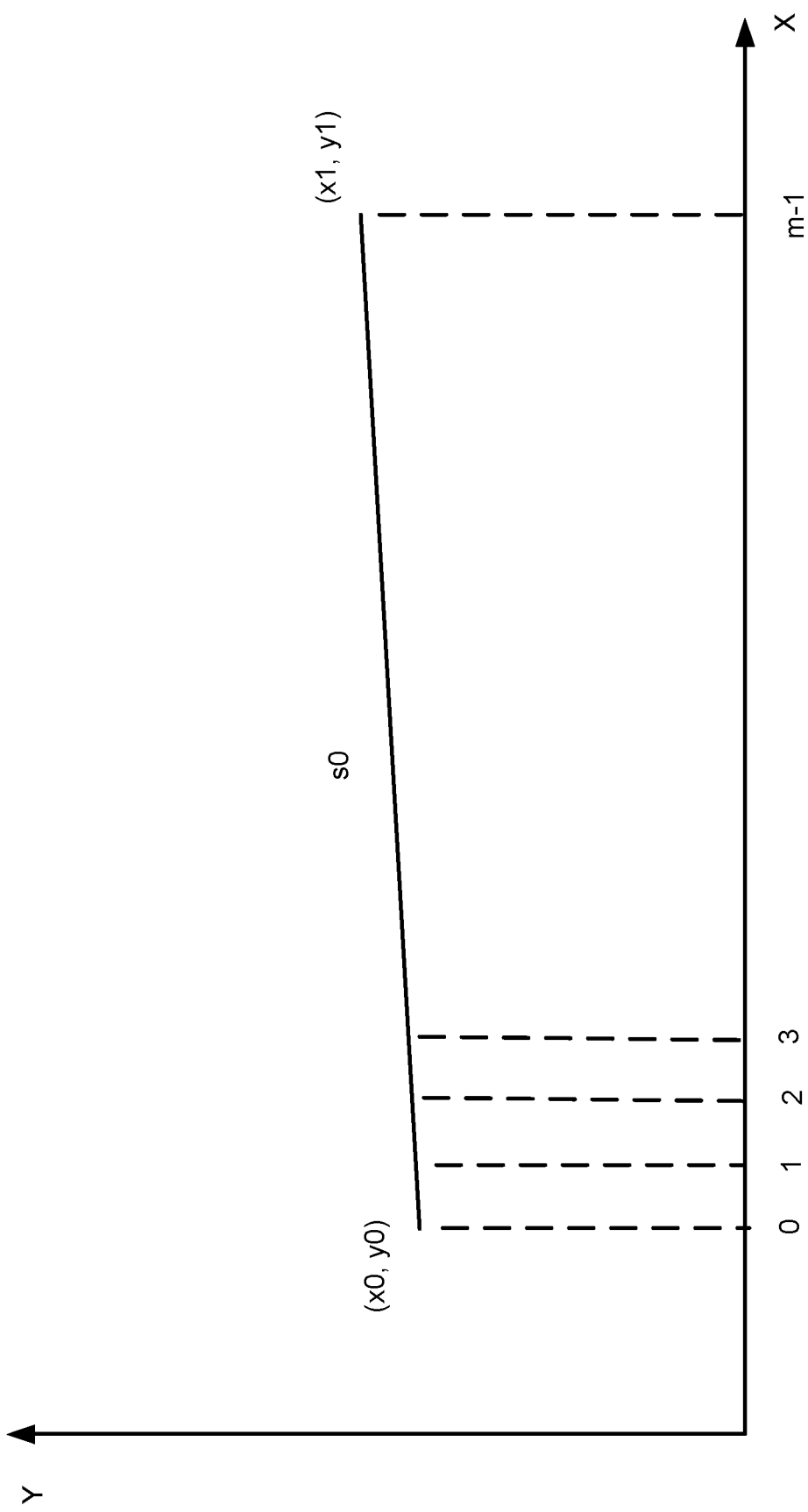
FIG. 6 shows a reference line segment further segmented into a number of sub-segments according to one embodiment.

According to one embodiment, each of the reference line segment is segmented into a number of sub-segments. Each sub-segment represents a piecewise sub-path within the piecewise path of the reference line segment. FIG. 6 is a diagram illustrating a segmentation of a reference line segment, where the reference line segment is further segmented into m sub-segments. Each sub-segment is represented by the quintic function of the same reference line segment. Thus, there are m intermediate points from one piecewise path as probing points. The goal is to minimize the quintic functions of the sub-segments. An objective function is defined as a sum of the outputs of the quintic functions of the sub-segments of each of the reference line segments. In one embodiment, an objective function is defined as follows:

$$\sum_{i=0}^{n-2} \sum_{j=0}^{m-1} \ddot{\theta}_i(s_j)^2$$

subject to the following point positional movement constraints $$(x_i - \bar{x}_i)^2 + (y_i - \bar{y}_i)^2 \leq r_i^2$$

In one embodiment, an objective function is defined as follows:

$$\sum_{i=0}^{n-1} \sum_{j=0}^{m-1} \omega_0 [\dot{\theta}_i(s_j)]^2 + \omega_1 [\ddot{\theta}_i(s_j)]^2 + \omega_2 \cdot \Delta s_i$$

where i=index of spiral paths/line segments, j=index of evaluation points in the respective spiral path i, w0, w1, and w2 are weights, capable of being determined, for example, empirically. $\theta(s)$ can be a function of a line segment, for example, a quintic function $\theta(s)=as^5+bs^4+cs^3+ds^2+es+f$, such that the sum of all line segments forms an entire reference line. $s_j$ can be a point at index j of the line segment. $\theta'(s)$ can be the first derivative of the line segment. $\theta''(s)$ can be the second derivative of the line segment, and $\Delta s_i$ is the length of the line segment i.

By summing the curvature (e.g. the first derivative of the quintic function of the line segment) and the length of the curve, this penalizes unnecessary curve length and straightens each curve as much as possible.

In one embodiment, an objective function is defined as follows:

$$\sum_{i=0}^{n-1} \sum_{j=0}^{m-1} \omega_0 [\dot{\theta}_i(s_j)]^2 + \omega_1 [\ddot{\theta}_i(s_j)]^2 + \omega_3 [\dddot{\theta}_i(s_j)]^2 + \omega_2 \cdot \Delta s_i$$

where $\theta'''(s)$ can be the third derivative of the function of each line segment (for example, where $\theta(s)$ is a quintic function). This further penalizes unnecessary curve length and straightens each curve.

In one embodiment, each line segment is defined as a quintic function $\theta(s)=as^5+bs^4+cs^3+ds^2+es+f$, the derivative of the line segment function defines the curvature of the segment, and the second derivative of the line segment function defines the rate of change of the curvature.

Figure 7:
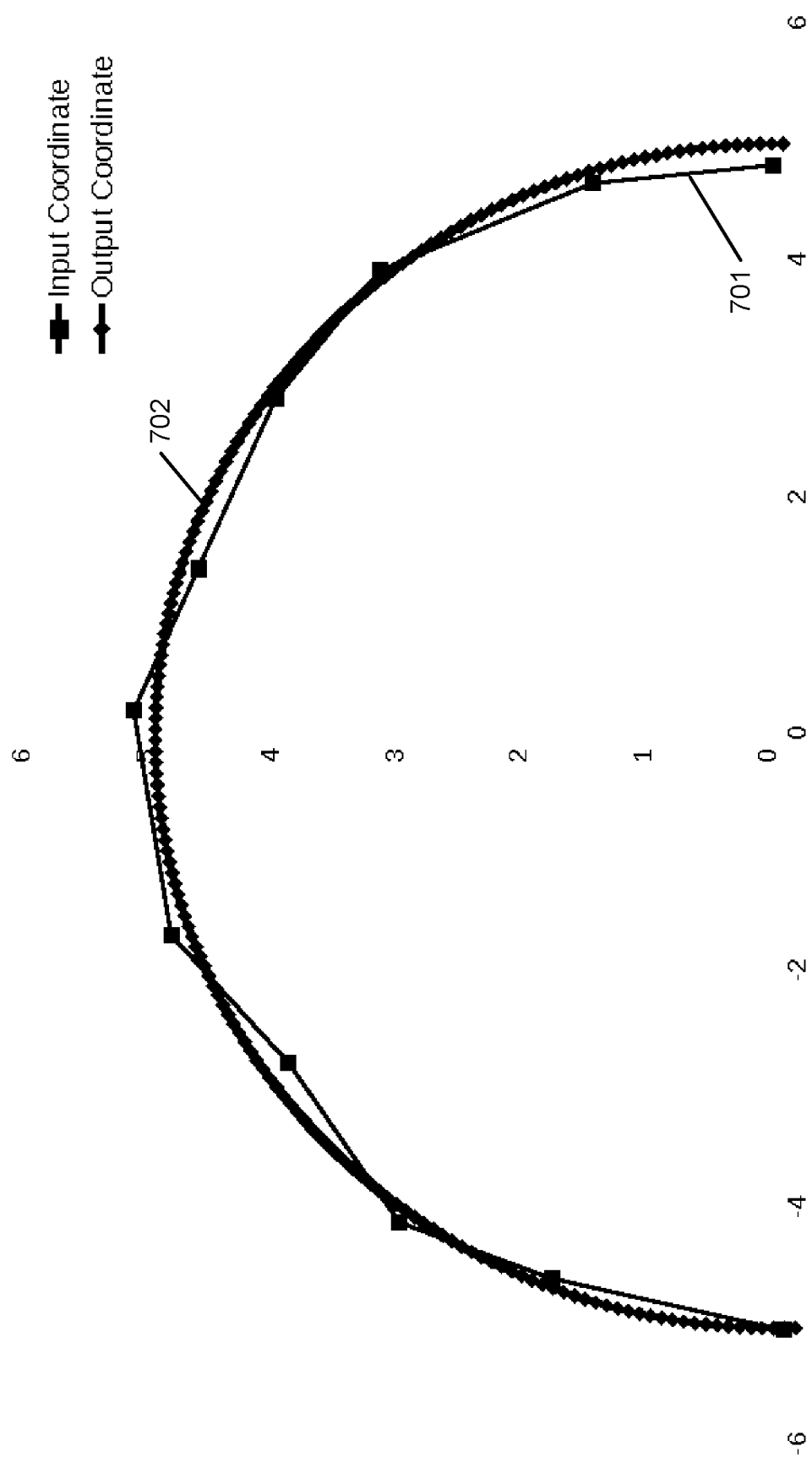
FIG. 7 shows an original reference line and an optimized reference line according to one embodiment.

In one embodiment, the objective function represents a sum of square of a second derivative of each quintic polynomial function. Coordinates $(\bar{x}_i, \bar{y}_i)$ represent the original position of input point pi, and ri represents a boundary for point pi, which may be user configurable. Coordinates (xi, yi) are derived based on the integrals of the corresponding quintic functions as described above. The new coordinates derived from the optimization are utilized to form a new reference line, which can be utilized to control the ADV. FIG. 7 shows an original reference line and an optimized reference line using at least a portion of the optimization described above.

Figure 8:
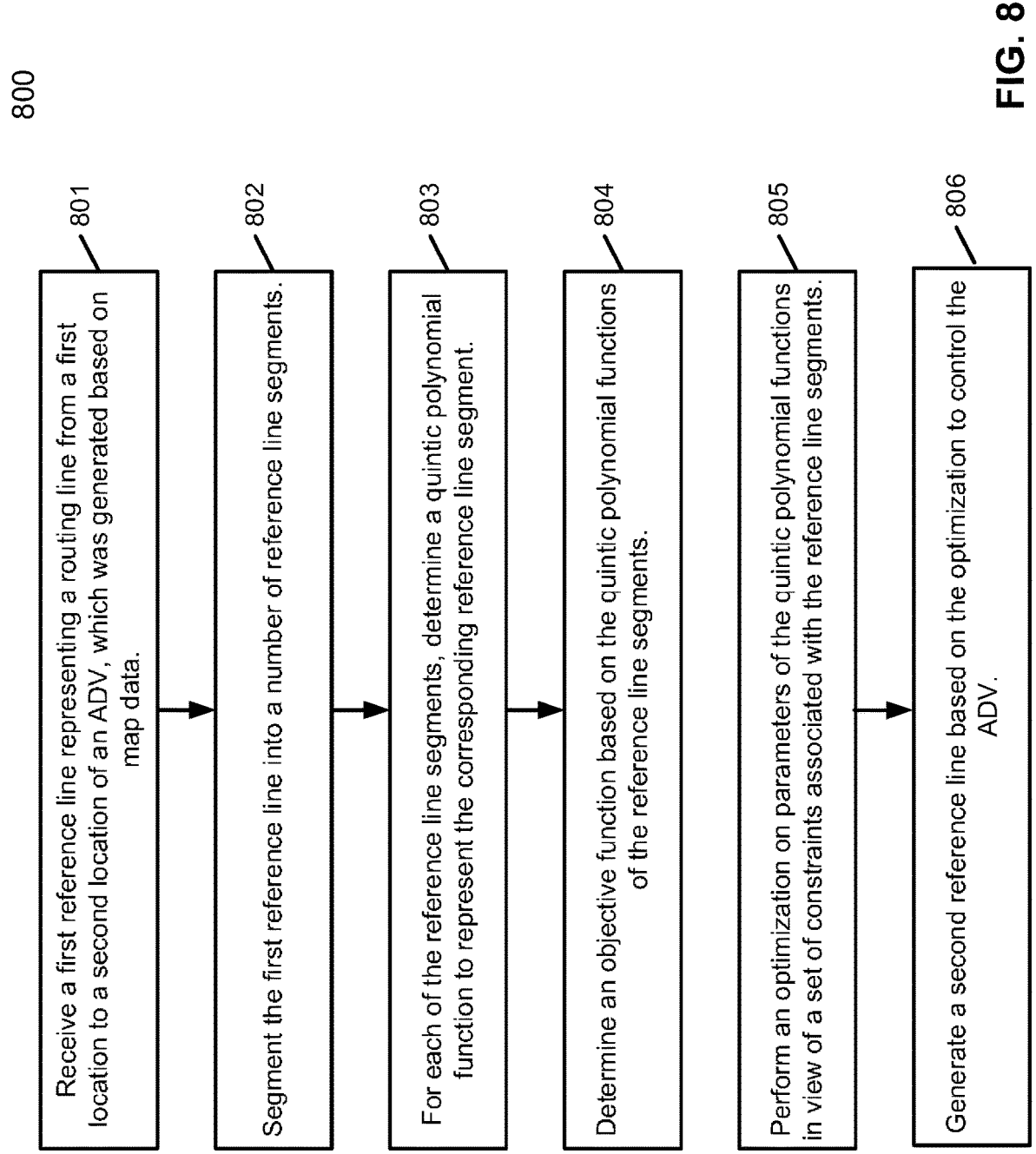
FIG. 8 is a flow diagram illustrating an example of process for optimizing a reference line according to one embodiment.

FIG. 8 is a flow diagram illustrating an example of a process for optimizing a reference line according to one embodiment. Process 800 may be performed by processing logic which may include software, hardware, or a combination thereof. For example, process 800 may be performed by planning module 305 of FIG. 4. Referring to FIG. 8, in operation 801, processing logic receives a first reference line that was generated based on map data. The first reference line represents a trajectory or routing line from a first location to a second location along which an ADV is supposed to follow. In operation 802, processing logic segments the first reference line into a number of reference line segments. Each reference line segment is terminated by a starting reference point and an ending reference point. Each reference point is represented by a set of properties including, but are not limited to, a location of the reference point in a 2D Cartesian space (x, y) and a direction (θ). The curvature K at the reference point can be obtained based on a derivative of direction (θ) and a curvature change rate can be obtained based on a derivative of curvature K.

For each of the reference line segments, in operation 803, processing logic determines a quintic polynomial function to represent the corresponding reference line segment. In operation 804, processing logic determines an objective function based on the quintic polynomial functions of the reference line segments. In operation 805, processing logic performs an optimization on parameters of the quintic polynomial functions of the objective function in view of a set of constraints (e.g., constraints based on θ, dθ, d2θ, x, y), such that an output of the objective function reaches minimum while the set of constraints are satisfied. In operation 706, a second reference line is generated based on the optimized parameters of the quintic polynomial functions of the objective function. The second reference line is utilized to control the ADV.

In performing the optimization, the parameters (e.g., coefficients a, b, c, d, e, and f) of the quintic polynomial functions are iteratively adjusted and optimized in a number of iterations, and the output of the objective function is evaluated. The parameters are configured based on the input points of each reference line segment, such as, x, y, direction, curvature, and curvature change rate. The goal is to optimize the location (x, y), direction, curvature, and curvature change rate of each quintic polynomial function, such that the output of the objective function reaches minimum. When the optimization reaches a predetermined exiting condition, the process will stop and the latest set of parameters will be obtained to generate the new reference line. In one embodiment, when a difference between outputs of two consecutive iterations of optimization is below a predetermined threshold, the iterative process stops. Alternatively, when a number of iterations reaches a predetermined number, the process will stop.

Referring now to FIG. 9, an autonomous driving vehicle (ADV) and/or systems within the ADV can process 910 map data, to generate a plurality of points that define a reference line along an ADV route from a first location to a second location, wherein each point has a two dimensional coordinate and each consecutive pair of points form a reference line segment along the reference line. The ADV can then initialize optimization parameters, for example, one or more of: the length of each reference line segment, the two-dimensional coordinate of each point, a direction of each reference line segment, a curvature of each reference line segment, and a curvature change rate of each reference line segment.

Initializing the optimization parameters can include, for example, initializing: the length of each reference line segment as the distance between consecutive points, the two-dimensional coordinate of each point as the initially generated coordinates from map data, the direction of each reference line segment as the arctan direction between two consecutive points, the curvature of each reference line segment as zero, and the change rate of each reference line as zero. In other words, each line segment can be initialized as straight (without curve).

The ADV can optimize 930 the optimization parameters of the route such that an output of an objective function is minimized, and a set of constraints associated with the reference line segments are satisfied. For example, each reference line segment can be defined by a quintic polynomial function, and the objective function, can be based on the quintic polynomial function and the optimization parameters.

In one embodiment, the optimization parameters can be varied such that an output of the quintic polynomial function at a starting point of the reference line segment is similar to a direction of the ADV at the starting point of the reference line segment and an output of the quintic polynomial function at an ending point of the reference line segment is similar to a direction of the ADV at a starting point of a next reference line segment.

In one embodiment, the set of constraints includes a condition in which a first order derivative of the quintic polynomial function at the starting point of the reference line segment is similar to a curvature at the starting point of the reference line segment, and wherein a first order derivative of the quintic polynomial function at the ending point of the reference line segment is similar to a curvature at the starting point of the next reference line segment.

The ADV can generate 940 a smooth reference line based on the optimized parameters, wherein the smooth reference line is utilized as a reference to direct the ADV from the first location to the second location. For example, the ADV can compute each of the coefficients a through f of the quintic function θ(s) of each line segment, based on the optimized variables, and generate a smooth reference line. The smooth reference line can be formed from new points having new coordinates, along the optimized quintic function of each line segment.

In one embodiment, the objective function can include a summation of: a curve length of each reference line segment; a square of the curvature (for example, the derivative of the quintic function defining a line segment) of the each reference line segment; and a square of the rate of change of the curvature (for example, the derivative of the curvature) of each reference line segment.

In one embodiment, the objective function can include a summation of: a curve length of each reference line segment; a square of the curvature (for example, the derivative of the quintic function defining a line segment) of the each reference line segment; a square of the rate of change of the curvature (for example, the derivative of the curvature) of each reference line segment; and a square of a derivative of the rate of change of the curvature of each reference line segment.

Figure 10:
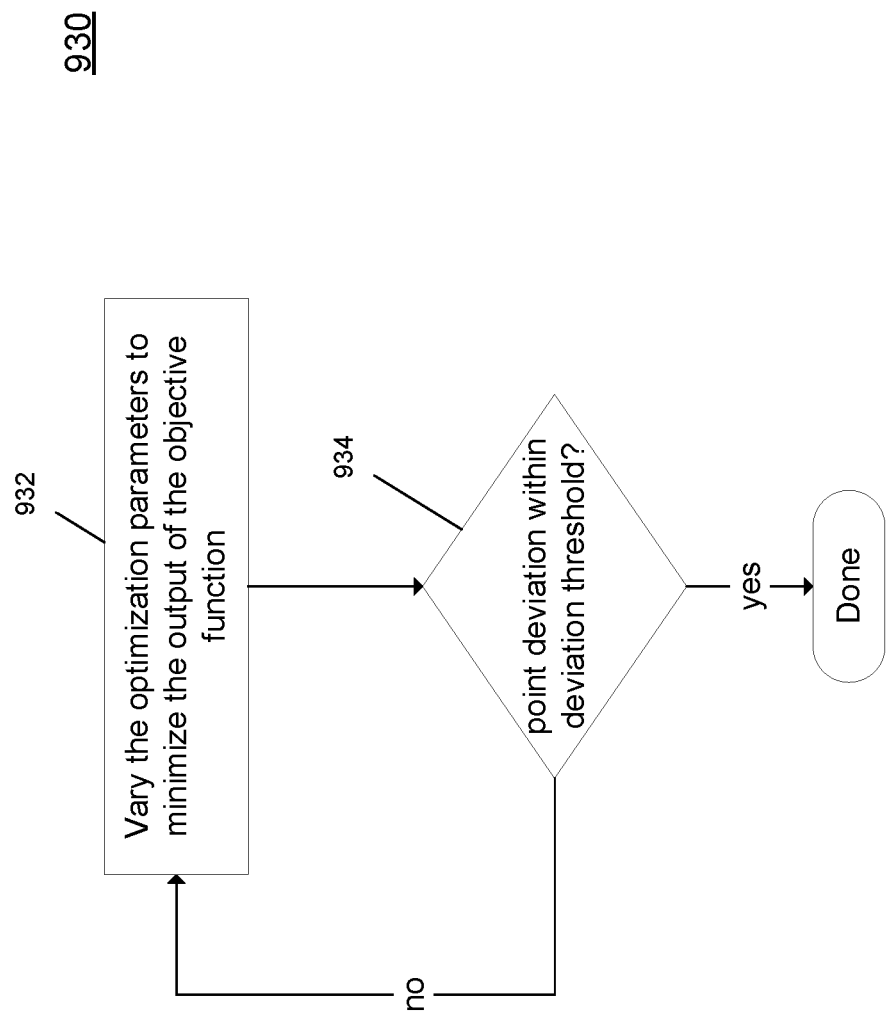
FIG. 10 is a flow diagram illustrating an example of varying the optimization parameters according to one embodiment.

Referring now to FIG. 10, in one embodiment, optimizing the optimization parameters includes varying 932 the optimization parameters to minimize the output of the objective function. For example, if the objective function is defined as $$\sum_{i=0}^{n-1}\sum_{j=0}^{m-1} \omega_0[\dot{\theta}_i(s_j)]^2 + \omega_1[\ddot{\theta}_i(s_j)]^2 + \omega_2 \cdot \Delta s_i$$

then the optimization parameters will be varied to reduce the value produced by the objective function.

The ADV can then evaluate 934 whether a point deviation is within a deviation threshold. The point deviation can be defined, for example, by a change in the coordinate of a particular point from the initial coordinate of the particular point, for example, when initialized or as generated from the map data. If the point deviation is beyond the deviation threshold, the ADV can repeatedly vary the optimization parameters, until the output of the objective function is minimized and the point deviation is within the deviation threshold. For example, the optimization parameters can be varied in a different direction and/or with a different step size as previously varied, so that the point deviation is reduced.

The point deviation can be, for example, a pre-determined threshold based on the reliability and/or confidence in the map data or the sensors that generated the map data.

Each of the terms in an objective function (for example, the curve length, the square of the curve, the square of the rate of change of curvature, and the square of the derivative of the rate of change of curvature) can be weighted.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
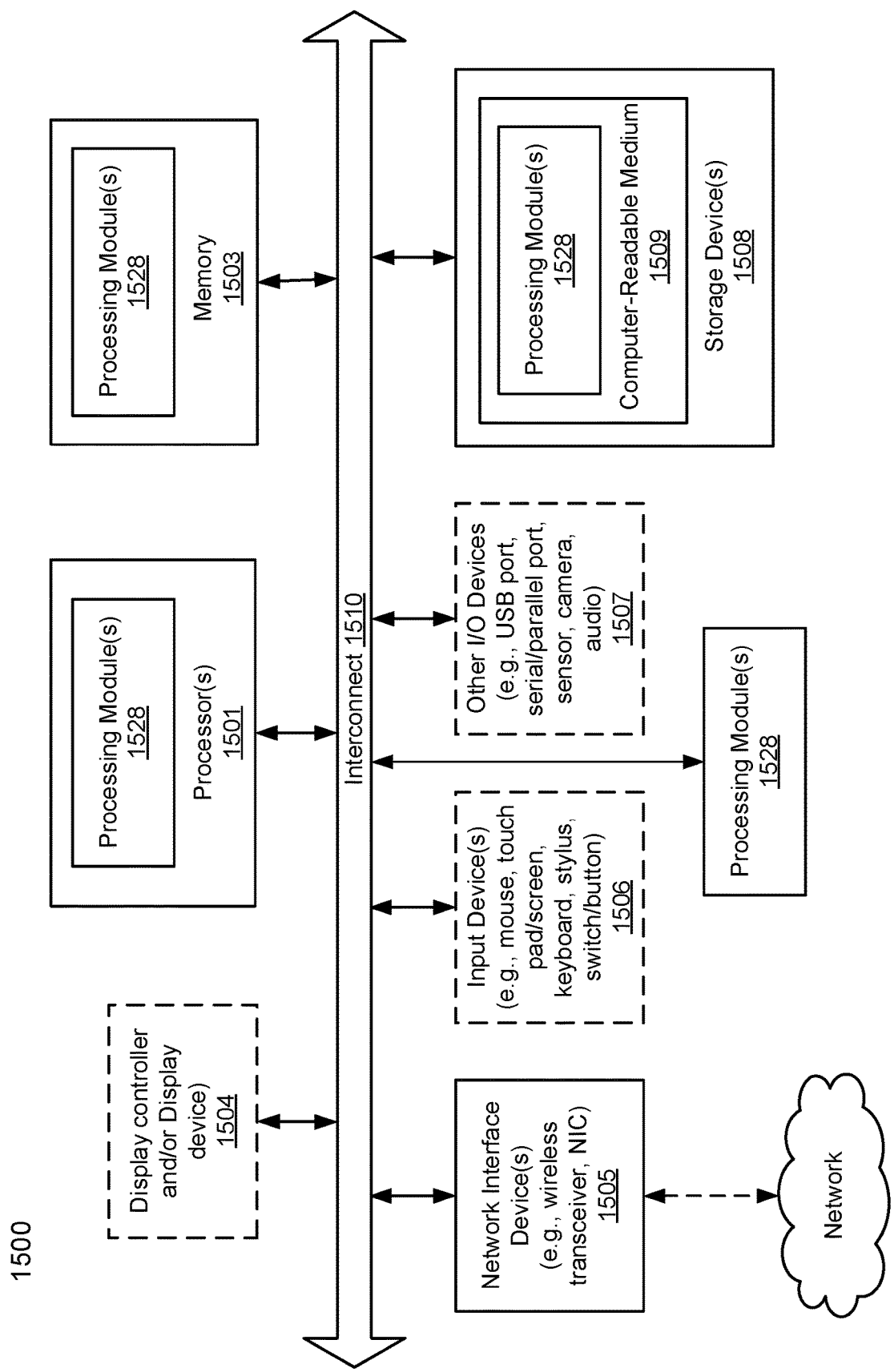
FIG. 11 is a block diagram illustrating a data processing system according to one embodiment.

FIG. 11 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
processing map data to generate a plurality of points that define a reference line along an ADV route from a first location to a second location, wherein each point includes a two dimensional (2D) coordinate, each consecutive pair of points form a reference line segment along the reference line and each reference line segment is defined by a quintic polynomial function having six coefficients;
initializing optimization parameters, wherein the optimization parameters include a length of each reference line segment, a 2D coordinate of each point, a direction of each reference line segment, a curvature of each reference line segment, and a curvature change rate of each reference line segment;
iteratively optimizing the optimization parameters of the route such that
an output of an objective function is minimized, the objective function including a summation of a) a curve length of each reference line segment, b) a square of the curvature of each reference line segment, and c) a square of the rate of change of the curvature of each reference line segment, and
a set of constraints associated with the reference line segments are satisfied, and the six coefficients of each polynomial function are determined based on the direction, the curvature and the curvature rate of change at a starting point and an ending point of each respective reference line segment; and
generating a smooth reference line based on the optimized parameters, wherein the smooth reference line is utilized as a reference to direct the ADV from the first location to the second location.

2. The method of claim 1, wherein the curve length of each reference line segment, the square of the curvature of the reference line segment, and the square of the rate of change of the curvature of the reference line segment are weighted.

3. The method of claim 1, wherein the objective function further comprises a summation of: a square of a derivative of the rate of change of the curvature of each reference line segment.

4. The method of claim 1, wherein optimizing the optimization parameters comprises:
varying the optimization parameters to minimize the output of the objective function;
evaluating whether a point deviation is within a deviation threshold, the point deviation defined by a change in the coordinate of a particular point from the initial coordinate of the particular point; and
if the point deviation is beyond the deviation threshold, repeating varying the optimization parameters in a different direction and/or with a different step size as previously varied, until the output of the objective function is minimized and the point deviation is within the deviation threshold.

5. The method of claim 4, wherein the deviation threshold is a pre-determined threshold based on a reliability of, or confidence in, one or more sensors that generated the map data, where a high confidence corresponds to a small threshold.

6. The method of claim 1, wherein the optimization parameters are varied such that an output of the quintic polynomial function at a starting point of each reference line segment is similar to a direction of the ADV at the starting point of each reference line segment and an output of the quintic polynomial function at an ending point of the reference line segment is similar to a direction of the ADV at a starting point of a next reference line segment.

7. The method of claim 1, wherein the set of constraints includes a condition in which a first order derivative of the quintic polynomial function at the starting point of each reference line segment is similar to a curvature at a starting point of the reference line segment, and wherein a first order derivative of the quintic polynomial function at an ending point of the reference line segment is similar to a curvature at a starting point of a next reference line segment.

8. A non-transitory machine-readable medium having instructions stored therein, which when executed by a processor, cause the processor to perform operations, the operations comprising:
processing map data to generate a plurality of points that define a reference line along an ADV route from a first location to a second location, wherein each point has a two dimensional (2D) coordinate, each consecutive pair of points form a reference line segment along the reference line and each reference line segment is defined by a quintic polynomial function having six coefficients;
initializing optimization parameters, wherein the optimization parameters include a length of each reference line segment, a 2D coordinate of each point, a direction of each reference line segment, a curvature of each reference line segment, and a curvature change rate of each reference line segment;
optimizing the optimization parameters of the route such that
an output of an objective function is minimized, the objective function including a summation of a) a curve length of each reference line segment, b) a square of the curvature of each reference line segment, and c) a square of the rate of change of the curvature of each reference line segment, wherein each reference line segment is defined by a quintic polynomial function,
a set of constraints associated with the reference line segments are satisfied, and
the six coefficients of each polynomial function are determined based on the direction, the curvature and the curvature rate of change at a starting point and an ending point of each respective reference line segment; and
generating a smooth reference line based on the optimized parameters, wherein the smooth reference line is utilized as a reference to direct the ADV from the first location to the second location.

9. The machine-readable medium of claim 8, wherein the curve length of each reference line segment, the square of the curvature of the reference line segment, and the square of the rate of change of the curvature of the reference line segment are weighted.

10. The machine-readable medium of claim 9, wherein the objective function includes a summation of a curve length of each reference line segment, a square of the curvature of each reference line segment, a square of the rate of change of the curvature of each reference line segment, and a derivative of the rate of change of the curvature of each reference line segment.

11. The machine-readable medium of claim 8, wherein optimizing the optimization parameters include:
    varying the optimization parameters to minimize the output of the objective function;
    evaluating whether a point deviation is within a deviation threshold, the point deviation defined by a change in the coordinate of a particular point from the initial coordinate of the particular point; and
    if the point deviation is beyond the deviation threshold, repeating varying the optimization parameters in a different direction and/or with a different step size as previously varied, until the output of the objective function is at a minimal value and the point deviation is within the deviation threshold.

12. The machine-readable medium of claim 11, wherein the deviation threshold is a pre-determined threshold based on the reliability of, or confidence in, one or more sensors that generated the map data, where a high confidence corresponds to a small threshold.

13. The machine-readable medium of claim 8, wherein the optimization parameters are varied such that an output of the quintic polynomial function at a starting point of each reference line segment is similar to a direction of the ADV at the starting point of each reference line segment and an output of the quintic polynomial function at an ending point of the reference line segment is similar to a direction of the ADV at a starting point of a next reference line segment.

14. The machine-readable medium of claim 8, wherein the set of constraints includes a condition in which a first order derivative of the quintic polynomial function at a starting point of each reference line segment is similar to a curvature at the starting point of the reference line segment, and wherein a first order derivative of the quintic polynomial function at an ending point of the reference line segment is similar to a curvature at a starting point of a next reference line segment.

15. A data processing system, comprising:
a processor; and
a memory coupled to the processor to store instructions, which when executed by the processor, cause the processor to perform operations, the operations including
processing map data to generate a plurality of points that define a reference line along an ADV route from a first location to a second location, wherein each point has a two dimensional (2D) coordinate, each consecutive pair of points form a reference line segment along the reference line and each reference line segment is defined by a quintic polynomial function having six coefficients;
initializing optimization parameters, wherein the optimization parameters include one or more of the following: a length of each reference line segment, a 2D coordinate of each point, a direction of each reference line segment, a curvature of each reference line segment, and a curvature change rate of each reference line segment;
optimizing the optimization parameters of the route such that
    an output of an objective function is minimized, the objective function including a summation of a) a curve length of each reference line segment, b) a square of the curvature of each reference line segment, and c) a square of the rate of change of the curvature of each reference line segment
    a set of constraints associated with the reference line segments are satisfied, and the six coefficients of each polynomial function are determined based on the direction, the curvature and the curvature rate of change at a starting point and an ending point of each respective reference line segment; and
generating a smooth reference line based on the optimized parameters, wherein the smooth reference line is utilized as a reference to direct the ADV from the first location to the second location.

16. The system of claim 15, wherein initializing the optimization parameters includes initializing a length of each reference line segment as the distance between consecutive points, a 2D coordinate of each point as the initially generated coordinates from map data, a direction of each reference line segment as an arctan direction between two consecutive points, the curvature of each reference line segment as zero, and the curvature change rate of each reference line as zero.

* * * * *